United States Patent Office 3,770,839
Patented Nov. 6, 1973

3,770,839
METHOD FOR PREPARING CYCLO-DODECATRIENE-1,5,9
Shunsuke Matsushima, Ibaraki, Japan, assignor to Sumitomo Chemical Co., Ltd., Osaka, Japan
No Drawing. Filed June 29, 1970, Ser. No. 50,914
Claims priority, application Japan, July 9, 1969, 44/54,660
Int. Cl. C07c 3/02
U.S. Cl. 260—666 B          11 Claims

ABSTRACT OF THE DISCLOSURE

Cyclododecatriene-1,5,9 is prepared by catalyzing the trimerization of butadiene-1,3 with the reaction product of an organic titanate, phosphoric acid, and aluminum alkyl halide that has a Ti—O—P linkage.

---

This invention relates to a method for preparing cyclododecatriene-1,5,9. More particularly, this invention relates to a method for preparing cyclododecatriene-1,5,9 which comprises trimerizing butadiene-1,3 in the presence of a novel catalyst system.

There are already known some proposals for obtaining cyclododecatriene-1,5,9 by the ring-closing trimerization of butadiene-1,3. For example, there is known a process wherein butadiene-1,3 is catalytically trimerized in the presence of a catalyst consisting of a combination of a halide of a transition metal such as titanium, chromium or nickel or an alkoxide of titanium and organic aluminum. It is also known to employ a complex compound of nickel, cobalt or iron as a catalyst for such ring-closing trimerization.

The present invention is to provide a process for preparing cyclododecatriene-1,5,9 which comprises trimerizing butadiene-1,3 in the presence of a novel catalyst system consisting essentially of (1) a compound obtained by reacting an organic titanate represented by the general formula $$Ti(OR^1)_4$$

(wherein $R^1$ is a substituted or unsubstituted alkyl, cycloalkyl, aralkyl or aryl group having 1 to 12 carbon atoms, and each $R^1$ may be same or different) with phosphoric acid or an organic phosphoric acid represented by the general formula $$(R^2O)_mP(O)(OH)_{3-m}$$

(wherein $R^2$ is a substituted or unsubstituted alkyl, cycloalkyl, aralkyl or aryl group having 1 to 12 carbon atoms, $m$ is 1 or 2, and $R^2$ may be same or different) and, (2) an alkylaluminum halide represented by the formula $$AlR_{3-n}X_n$$

wherein R is an alkyl group, X is a halogen atom and $n$ is an arbitrary number from 1 to 2, or a mixture of at least two compounds represented by the formulas (A) $AlR_{3-n}X_n$, (B) $AlR_3'$ and (C) $AlX_3'$ wherein R and R' are each an alkyl group, X and X' are each a halogen atom, and $n$ is an arbitrary number from 1 to 2.

The component (1) of the catalyst to be used in the present invention is a compound obtained by reacting the above indicated organic titanate with the above indicated phosphoric acid or organic phosphoric acid.

The organic titanates represented by the above formula include alkyl titanates, cycloalkyl titanates, aralkyl titanates and aryl titanates. The four ester residues constituting these titanates may be same or different. Further, these ester residues may have substituents. More specific examples of the organic titanates are such alkyl titanates such as tetramethyl titanate, tetraethyl titanate, tetranormalpropyl titanate, tetraisopropyl titanate, tetranormalbutyl titanate, tetraisobutyl titanate, tetrasecondarybutyl titanate, tetratertiarybutyl titanate, tetranormalamyl titanate, tetramethylbutyl titanate, tetra 2-methylbutyl titanate, tetra 2,2-dimethylpropyl titanate, tetra 1-methylbutyl titanate, tetranormalhexyl titanate, tetraheptyl titanate, tetranormaloctyl titanate, tetra 2-ethylhexyl titanate, tetranormaldecyl titanate, tetranormaldodecyl titanate, tetra 2-chloroethyl titanate, dimethyldibutyl titanate, triethylbutyl titanate and ethyltriheptyl titanate; cycloalkyl titanates such as tetracyclopentyl titanate, tetracyclohexyl titanate, tetramethylcyclohexyl titanate and ethyltricyclohexyl titanate; aralkyl titanates such as tetrabenzyl titanate and tetra 1-phenylbutyl titanate; and aryl titanates such as tetraphenyl titanates; tetra 2-methylphenyl titanates, tetracresyl titanate and tetra 2-chlorophenyl titanate.

The reactant to be reacted with such organic titanate is a phosphoric or organic phosphoric acid represented by the before indicated formula. The phosphoric acids include various phosphoric acids such as orthophosphoric acid, pyrophosphoric acid, metaphosphoric acid, polyphosphoric acid, phosphoric anhydride and their mixtures. The organic phosphoric acids include alkyl phosphoric acids, cycloalkyl phosphoric acids, aralkyl phosphoric acids and aryl phosphoric acids. More specific examples of organic phosphoric acids are dialkyl phosphoric acids such as dimethyl phosphoric acid, diethyl phosphoric acids and aryl phosphoric acids. More specific examples phoric acid, dinormalbutyl phosphoric acid, diisobutyl phosphoric acid, disecondarybutyl phosphoric acid, dinormalamyl phosphoric acid, di-3-methylbutyl phosphoric acid, di-2-methylbutyl phosphoric acid, di-2,2-dimethylpropyl phosphoric acid, di-1-methylbutyl phosphoric acid, dinormalhexyl phosphoric acid, dinormalheptyl phosphoric acid, dinormaloctyl phosphoric acid, di-2-ethylhexyl phosphoric acid, dinormaldecyl phosphoric acid, dinormaldodecyl phosphoric acid, di-2-chloroethyl phosphoric acid, ethylnormaloctyl phosphoric acid and butylnormalamyl phosphoric acid; monoalkyl phosphoric acids such as monomethyl phosphoric acid, monoethyl phosphoric acid, mononormalisopropyl phosphoric acid, monoisopropyl phosphoric acid, mononormalbutyl phosphoric acid, monoisobutyl phosphoric acid, monosecondarybutyl phosphoric acid, mononormalamyl phosphoric acid, mono 3-methylbutyl phosphoric acid, mono 2-methylbutyl phosphoric acid, mono 2,2-dimethylpropyl phosphoric acid, mono- 1-methylbutyl phosphoric acid, mononormalhexyl phosphoric acid, mononormalheptyl phosphoric acid, mononormaloctyl phosphoric acid, mono 2-ethylhexyl phosphoric acid, mononormaldecyl phosphoric acid, mononormaldodecyl phosphoric acid and mono 2-chloroethyl phosphoric acid; dicycloalkyl phosphoric acids such as dicyclopentyl phosphoric acid, dicyclohexyl phosphoric acid, dimethylcyclohexyl phosphoric acid and diethylcyclohexyl phosphoric acid; monocycloalkyl phosphoric acids such as monocyclopentyl phosphoric acid, monocyclohexyl phosphoric acid and monomethylcyclohexyl phosphoric acid; aralkyl phosphoric acids such as dibenzyl phosphoric acid; di-1-phenylbutyl phosphoric acid, monobenzyl phosphoric acid and mono 1-phenylbutylphosphoric acid; and aryl phosphoric acids such as diphenyl phosphoric acid, di-2-methylphenyl phosphoric acid, di-2-chlorophenyl phosphoric acid, monophenyl phosphoric acid, mono 2-methylphenyl phosphoric acid and mono 2-chlorophenyl phosphoric acid.

In the reaction of such organic titanate and phosphoric acid or organic phosphoric acid, respectively different kinds of organic titanates, phosphoric acids and organic phosphoric acids can be used as mixtures.

In the synthesis of the component (1) of the catalyst, about 0.1–10 moles, preferably 0.25–3 moles of the phosphoric acid or organic phosphoric acid may be reacted with one mole of the organic titanate.

The reaction of the organic titanate with the phosphoric acid or organic phosphoric acid may be conducted in the absence of a solvent. However, in order to facilitate stirring of the reaction mixture and the removal of reaction heat, it is preferable to use a solvent. There can be used any solvent which dissolves at least one of the organic titanate and phosphoric acid or organic phosphoric acid and is inert to these compounds. Examples of such solvent are aromatic hydrocarbons such as benzene, toluene and xylene; aliphatic hydrocarbons such as heptane; hydrocarbon halides such as carbon tetrachloride, dichloromethylene and dichloroethane; and ethers such as diethylether, tetrahydrofuran and dioxane. Alcohols such as methanol, ethanol, butanol and octanol may also be used. However, since an alcohol causes an alcohol exchange reaction with an organic titanate, it is not desirable to use an alcohol except in the case of simultaneously carrying out an alcohol exchange reaction with the organic titanate or in the case of using the same kind of alcohol as the organic residue of the organic titanate.

The reaction of the organic titanate with the phosphoric acid or organic phosphoric acid can be carried out at a temperature of −80 to 150° C., preferably 20 to 130° C.

When the organic titanate is used in an amount larger than the equivalent to the OH group of the organic phosphoric acid, a part of the organic titanate remains unreacted. It is preferable to remove such unreacted titanate by distillation.

In carrying out the reaction, it is generally, preferable to add the phosphoric acid or organic phosphoric acid solution dropwise to the organic titanate solution, because the reaction product can be more easily obtained thereby. On the contrary, it is also possible to add the organic titanate solution to the phosphoric acid or organic phosphoric acid solution. However, in this case, particularly when phosphoric acid or dibasic organic phosphoric acid solution is used, there is a tendency to form an insoluble substance of a high molecular weight. Even if the organic titanate is quantitatively added to this insoluble substance, a soluble product is hardly obtained. Therefore, when an insoluble reaction product is desired the latter mentioned order of addition may be taken.

An alcohol or phenol produced by the reaction can be removed alone or together with the used solvent by distillation from the reaction mixture during or after the reaction. In case the boiling point of the distillate is high, the distillation should be conducted under a reduced pressure.

When the reaction product is further dried, a solid or high viscosity liquid is obtained as a residue. Generally, the resulting product is soluble in an organic solvent.

In the component (1) of the catalyst of the present invention which is the above produced solid or high viscosity liquid, there is observed no OH group which has been present in the starting phosphoric acid or organic phosphoric acid, upon infrared spectral analysis. From the fact that an alcohol or phenol in an equivalent corresponding to this OH group is produced during the reaction, it is believed that at least one Ti—O—P linkage is produced per each of the titanium and phosphorus atoms. Thus, for example, it is considered that, when a tetralkyl titanate and dialkylphosphoric acid are used, there occurs the following reaction:

$(R^1O)_4Ti + (R^2O)_2P(O)(OH) \rightarrow$
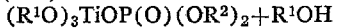
$(R^1O)_3TiOP(O)(OR^2)_2 + R^1OH$ A reaction similar to this reaction is known in the literature e.g. R. Feld; J. Chem. Soc., 1964, 3963–5.

The number of the Ti—O—P linkages in one molecule of the reaction product is equal to the number of the OH groups in the phosphoric acid or organic phosphoric acid used in the reaction. Thus, when a phosphoric acid, dibasic organic phosphoric acid or monobasic organic phosphoric acid is used, generally, respectively 3, 2 or one Ti—O—P bond is formed in the product. It is thought that, in case the amount of the organic titanate to be used in the reaction is less than the equivalent to the OH group in the phosphoric acid or dibasic organic phosphoric acid, a linkage of the formula ${Ti—O—P—O}_n$ is formed and a high molecular weight compound is produced.

The component (1) of the catalyst of the present invention may range from a compound of a simple structure to a very complicated compound or their mixtures, depending upon the kinds and mutual mol ratio of the organic titanate and phosphoric acid, dibasic organic phosphoric acid or monobasic organic phosphoric acid.

As described above, the component (1) of the catalyst is, for example, a compound obtained by reacting the organic titanate with the phosphoric acid but it is impossible to represent a simple formula as the component (1) ranges from a compound of a simple structure to a very complicated compound. But the component (1) has at least one Ti—O—P linkage in the molecule and has the number subtracted the number of Ti—O—P linkage bonded with titanium atom from 4 of titanium valence, and further has at least one ester residue, i.e., alkoxy, cycloalkoxy, aralkoxy, or aryloxy group, derived from the organic titanate as described above is bonded therewith.

The structure included phosphoric atom has ester of the phosphoric acid or the form of the phosphoric acid, i.e.

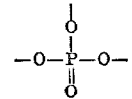

The phosphoric atom has alkoxy, cycloalkoxy, aralkoxy, or aryloxy derived from the organic phosphoric acid as described above, besides Ti—O—P linkage.

But the sum of the number of Ti—O—P linkages and number of the organic groups is 3. When an OH group is bonded to the phosphoric acid the sum of Ti—O—P linkage, organic group and OH group is 3.

When an organic group is not bonded to the phosphoric atom the number of Ti—O—P linkages or the sum of Ti—O—P and OH group is 3.

Further, the phosphoric atom may be bonded with a P—O—P linkage. In this case, the P—O—P linkage is derived from meta-, pyro- or poly-phosphoric acid or is an equivalent form consisted in meta-, pyro- or poly-phosphoric acid.

Among these compounds, the simple structure compounds can be represented by the general formulae:

$$[(R^1O)_3TiO]_mP(O)(OR^2)_{3-m}$$

or $$(R^1O)_lTi[OP(O)(OR^2)_2]_{4-l}$$

wherein $m$ is 0, 1 or 2, and $l$ is 1, 2 or 3.

These molecule structures can be estimated from infrared spectral analysis, nuclear magnetic analysis, elementary analysis, the amount of the liberated alcohol and the yield as the reaction is quantatively carried out.

The component (2) of the catalyst to be used in the present invention is an alkyl aluminum halide such as dialkylaluminum halide, alkylaluminum sesquihalide or alkylaluminum dihalide. Typical examples of such compounds are diethylaluminum chloride, diisobutylaluminum chloride, diisobutylaluminum bromide, diethylaluminum iodide, diphenylaluminum chloride, ethylaluminum sesquichloride, ethylaluminum dichloride and isobutylaluminum dichloride, and their mixtures.

It is also possible to employ a mixture of an organic aluminum compound and an aluminum halide, such as a mixture of a trialkyl aluminum and an aluminum halide alkyl aluminum halide. The aluminum halides which may be used are, for example, aluminum chloride, aluminum bromide and aluminum iodide. The alkyl aluminum halide is as defined above. The atomic ratio of titanium to aluminum may be 0.5 to 500 atoms, preferably 1 to 250 atoms, of aluminum based on one atom of titanium.

According to the invention, butadiene-1,3 is contacted with the above mentioned novel catalyst for conducting the catalytic trimerization of butadiene.

The trimerization may be carried out in the absence of a solvent. However, usually, it is preferable to conduct the trimerization in the presence of an inert solvent. Examples of the useful solvents are aliphatic, alicyclic or aromatic hydrocarbons or halogenated hydrocarbons such as pentane, hexane, heptane, cyclohexane, methyl cyclohexane, benzene, toluene, xylene, Tetralin, Decalin, cyclododecatriene, monochlorobenzene or tetrachloroethylene. Particularly it is convenient, for the separation and purification of the product, to use as a solvent trans, trans, cis-cyclododecatriene-1,5,9.

These solvents may be used alone but a mixture of two or more of them can also be used. For example, fractions of petroleum such as petroleum ether, light oil, kerosene and naphtha may be used. It is desirable to remove in advance from such solvent polar impurities which are likely to inactivate the catalysts.

The amount of each component comprising the catalyst may be varied depending on the reaction conditions, but the component (1) of the catalyst may be used 0.001 to 10 parts by weight and the component (2) of the catalyst may be used 0.01 to 100 parts by weight based on 1,000 parts by weight of the solvent. Butadiene-1,3 may be used 20 to 500,000, preferably 50 to 50,000 parts by weight, based on one part by weight of the component (1) of the catalyst.

The reaction temperature may be —20 to 150° C., preferably 30 to 70° C. The reaction time may be carried out for several minutes to ten hours. Generally the reaction is carried out under atmospheric pressure but it is also possible to carry out the reaction at a pressure of the vapor pressure of butadiene-1,3 or below the vapor pressure. The reaction can be carried out by a batch system or continuous system.

Various polymers and isomers are often produced by this reaction. However, any desired product can be isolated by such ordinary method as, for example, fractional distillation, fractional crystallization or filtration.

The reaction product is mostly trans, trans, cis-cyclododecatriene-1,5,9. However, such dimer as 4-vinylcyclohexene-1 or cyclooctadine-1,5-, such trimer as trans, trans, trans-cyclododecatriene or a higher molecular weight substance is also produced. The later product(s) can be separated for some industrial uses.

In the process of the present invention, trans, trans, cis-cyclododecatriene-1,5,9 is the predominant product. By selecting the reaction conditions, the formation of trans, trans, trans-cyclododecatriene which is difficult to separate from the main desired product can be minimized.

Further, it is a feature of the catalyst system used in the process of the present invention that trans, cis, cis-cyclododecatriene-1,5,9 is substantially not produced. Thus, the present invention is very advantageous for the production of raw materials for an organic synthetic industry where the use only of trans, trans, cis-cyclododecatriene is desired.

The invention will be further explained by the following examples which are given for illustration purposes only and not for limiting the scope of the invention.

The first components A to F of the catalyst used in these examples were prepared as follows:

SYNTHESIS OF THE FIRST COMPONENT A OF THE CATALYST

In a flask provided with a reflux condenser fitted with a trap of a capacity of 15 cc. and a capillary tube for bubbling nitrogen gas, there were charged 10.0 g. of tetranormalbutyl titanate dissolved in 100 cc. of toluene. The content was heated to about 50° C. and then the pressure was reduced to 100 mm. Hg and, while slowly introducing nitrogen gas, 6.2 g. of dinormalbutyl phosphoric acid dissolved in 80 cc. of toluene were gradually added under reflux to the above solution. Every hour, the liquid condensed in the trap was discharged and 15 cc. of toluene were added thereto. This operation was repeated three times. Then the substances distilling out around the above temperature and pressure were all distilled out. Then, the volatile substance was completely distilled out at 100° C. under a pressure reduced to 1.5 mm. Hg for 2 hours while flowing nitrogen through the capillary tube, to dry the reaction product. As a residue, 14.2 g. of a light yellow viscous liquid (the first component A of the catalyst) were obtained.

The amount of n-butanol in the distillate was 2.2 g. which substantially coincided with the equivalent to the tetranormalbutyl titanate or dinormalbutyl phosphoric acid. Further, in the infrared spectrum of the viscous liquid of the reaction product, the absorption band of OH present in the dinormalbutyl phosphoric acid was not observed. These facts indicate that a Ti—O—P linkage is formed in the reaction product.

SYNTHESIS OF THE FIRST COMPONENTS B TO F OF THE CATALYST

By substantially the same operation as for the synthesis of the first component A of the catalyst, the first component B to F were synthesized. The conditions and results of the syntheses together with those of the first component A are shown in Table I.

TABLE I

| Catalyst first component | Reactants | | | | Reaction temp. (° C.) | Reaction pressure (mm. Hg) | Product yield (g.) | Remarks |
|---|---|---|---|---|---|---|---|---|
| | Titanate | Amount (g.) | Phosphoric acid | Amount (g.) | | | | |
| A | Tetra-n-butyl titante | 10.0 | Di-n-butyl phosphoric acid | 6.2 | Ca. 50 | 100 | 14.2 | Light yellow viscous liquid. |
| B | Tetra-ethyl titanate | 10.0 | Monoethyl phosphoric acid | 2.8 | 110–118 | (a) | 10.8 | Light red viscous liquid. |
| C | do | 10.0 | Di-n-amyl phosphoric acid | 10.4 | 110–120 | (a) | 18.5 | Light yellow viscous liquid |
| D | Tetra-n-butyl titanate | 10.0 | Phosphoric acid | 1.8 | Ca. 50 | (a) | 8.6 | Do. |
| E | do | 10.0 | Di-n-butyl phosphoric acid | 12.4 | Ca. 50 | 100 | 17.9 | Light yellow greasy solid. |
| F | Tetra-phenyl titanate | 10.0 | Mono-n-butyl phosphoric acid | 1.7 | 112–120 | (a) | 9.8 | Red solid. | a Atmospheric.

However, in the synthesis of the first component D of the catalyst, normal butanol was used as the solvent and the reaction was carried out while being sufficiently stirred. Further, in the synthesis of the first component F of the catalyst, the liquid accumulated in the trap was not discharged and no further addition of toluene was conducted.

Further, in the case of completely distilling out the volatile substance, when the pressure in the system was decreased to about 5.0 mm. Hg and was heated to 60 to 63° C., phenol was distilled out.

Example 1

160 cc. of benzene were charged into a flask of 300 cc., the atmosphere in the flask was replaced by dry nitrogen. Then 0.050 g. of the first component A of the catalyst dissolved in 5 cc. of normal heptane and 0.62 g. of ethylaluminum sesquichloride were added thereto and the mixture was well stirred to prepare a catalyst system. Then, butadiene was introduced into the flask at such rate that the butadiene was substantially instantly absorbed in the solution under the atmospheric pressure and the reaction was conducted for 2 hours while keeping a temperature of 60° C. under heating. Then about 5 cc. of isopropyl alcohol were added and the reaction was stopped.

The reaction product was found by gas chromatographic analysis and fractional distillation to be 0.10 g. of 4-vinylcyclohexene-1 (referred to as VCH hereinafter), 0.06 g. of cyclooctadiene-1,5 (referred to as COD hereinafter), 0.25 g. of trans, trans, trans-cyclododecatriene-1,5,9 (referred to as ttt-CDT hereinafter), 15.3 g. of trans, trans, cis-cyclododecatriene-1,5,9 (referred to as ttc-CDT hereinafter) and 0.71 g. of a higher polymer.

For comparison, the above-mentioned operation was repeated except that 0.050 g. of tetranormalbutyl titanate and 0.62 g. of ethylaluminum sesquichloride were used as the catalyst. The reaction product was analyzed by the method as described in the above and it was found that there were 0.35 g. of VCH, 0.11 g. of COD, 1.03 g. of ttt-CDT, 13.5 g. of ttc-CDT and 1.22 g. of a higher polymer.

Examples 2 to 8

Butadiene was trimerized by the operation as described in Example 1 with catalysts prepared by combining the first components B to F of the catalyst shown in Table I with the second components of the catalyst shown in Table II. The reaction conditions and the results analyzed by gas chromatography and fractional distillation of the reaction products are shown in Table II.

What is claimed is:

1. A method for preparing cyclododecatriene-1,5,9 which comprises trimerizing butadiene-1,3 using as a direct contact catalyst the system consisting essentially of (1) a compound obtained by reacting an organic titanate represented by the formula $Ti(OR^1)_4$ wherein $R^1$ is a substituted or unsubstituted alkyl, cycloalkyl, aralkyl or aryl group having 1 to 12 carbon atoms, each $R^1$ being the same or different, with phosphoric acid or an organic phosphoric acid represented by the formula $$(R^2O)_m P(O)(OH)_{3-m}$$

wherein $R^2$ is substituted or unsubstituted alkyl, cycloalkyl, aralkyl or aryl group having 1 to 12 carbon atoms, $m$ is 1 or 2, each $R^2$ being the same or different, and (2) an alkyl aluminum halide represented by the formula $AlR_{3-n}X_n$ wherein R is an alkyl, X is a halogen atom and $n$ is 1 or 2, or a mixture of at least two compounds represented by the formulas (A) $AlR_{3-n}X_n$,
(B) $AlR'_3$
and
(C) $AlX'_3$ wherein R and R' are each an alkyl group, X and X' are each a halogen atom, and $n$ is 1 or 2, said reaction product 1 being characterized by having a Ti—O—P linkage.

2. A method according to claim 1, wherein the trimerization is carried out in the presence or absence of a solvent.

3. A method according to claim 2, wherein the solvent is at least one member selected from the group consisting of aliphatic, alicyclic or aromatic hydrocarbons, and halogenated hydrocarbons.

4. A method according to claim 1, wherein the trimerization is carried out at a temperature from —20° C. to 150° C.

TABLE II

| | Catalyst | | | | Products | | | | | |
|---|---|---|---|---|---|---|---|---|---|---|
| | 1st compound | | 2nd compound | | | | | | | Higher |
| Ex. | Kind | Amount (g.) | Kind | Amount (g.) | VCH (g.) | COD (g.) | $C_{12}$ [a] (g.) | ttt-CDT (g.) | ttc-CDT (g.) | polymer [b] (g.) |
| 2 | B | 0.050 | AlEt$_{1.5}$Cl$_{1.5}$ | 0.62 | 0.49 | 0.74 | 0.00 | 1.26 | 96.4 | 5.2 |
| 3 | C | 0.050 | AlEtCl$_2$ | 0.64 | 0.17 | 0.00 | 0.78 | 1.05 | 75.5 | 17.8 |
| 4 | B | 0.050 | AlEtCl$_2$ | 0.64 | 0.12 | 0.00 | 0.65 | 0.83 | 61.0 | — |
| 5 | D | 0.050 | AlEt$_2$Cl | 0.60 | 0.13 | 0.20 | 0.24 | 0.07 | 7.73 | — |
| 6 | D | 0.050 | AlEt$_{1.5}$Cl$_{1.5}$ | 0.62 | 0.31 | 0.32 | 0.00 | 0.74 | 55.4 | — |
| 7 | E | 0.080 | AlEt$_2$Cl | 0.60 | 0.42 | 0.08 | 0.00 | 2.16 | 10.0 | — |
| 8 | F | 0.115 | AlEt$_{1.5}$Cl$_{1.5}$ | 0.62 | 0.34 | 0.51 | 0.00 | 0.93 | 75.5 | — |

[a] $C_{12}$ compounds other than CDT.
[b] The sign — indicates that no analysis was conducted.

NOTE.—Reaction temp.: 60° C., Time: 2 hours.

160 cc. of benzene were charged into a flask of 300 cc. and the atmosphere in the flask was replaced by dry nitrogen. Then butadiene was well absorbed into this solvent at the room temperature. Then, as soon as 0.050 g. of the first component C dissolved in 5.0 cc. of normal heptane and 0.62 g. of ethylaluminum sesquichloride were added thereto successively with stirring, the reaction started and the temperature began to rise. Then butadiene was introduced into the flask at such rate that butadiene was substantially instantly absorbed under the atmospheric pressure. The reaction was conducted for 50 minutes while keeping at 60° C. under heating. The reaction was stopped by adding about 5 cc. of isopropyl alcohol.

The reaction product was analyzed by a gas chromatography and fractional distillation, and it was found that there were 0.38 g. of VCH, 0.23 g. of COD, 0.82 g. of ttt-CDT, 83.9 g. of ttc-CDT and 4.7 g. of a higher polymer.

5. A method according to claim 1, wherein the trimerization is carried out at a temperature from 30° C. to 70° C.

6. A method according to claim 1, wherein the trimerization is carried out under atmospheric pressure or at a pressure of the vapor pressure of butadiene-1,3 or below the vapor pressure.

7. A method according to claim 1, wherein the component (1) of the catalyst is used 0.001 to 10 parts by weight per 1,000 parts by weight of the solvent.

8. A method according to claim 1, wherein the component (2) of the catalyst is used 0.01 to 100 parts by weight per 1,000 parts by weight of the solvent.

9. A method according to claim 1, wherein butadiene-1,3 is used 20 to 500,000 parts by weight per one part by weight of the component (1) of the catalyst.

10. A method according to claim 1, wherein butadiene-1,3 is used 50 to 50,000 parts by weight per one part by weight of the component (1) of the catalyst.

11. A method according to claim 1, wherein the trimerization period of time is several minutes to ten hours.

References Cited
UNITED STATES PATENTS

| | | | |
|---|---|---|---|
| 3,149,173 | 9/1964 | Wittenberg et al. | 260—666 B |
| 3,149,174 | 9/1964 | Mueller et al. | 260—666 B |
| 3,663,639 | 5/1972 | Morikawa et al. | 260—666 B |
| 3,642,924 | 2/1972 | Morikawa | 260—666 B |
| 3,641,187 | 2/1972 | Furukawa et al. | 260—666 B |
| 3,476,820 | 11/1969 | Furukawa et al. | 260—666 B |

DELBERT E. GANTZ, Primary Examiner
V. O'KEEFE, Assistant Examiner

U.S. Cl. X.R.
252—429 B, 431 P